INVENTOR.
ROGER G. PAPELIAN
WALTER JAMES BUDZYNA
BY Albert A. Mahassel
ATTORNEY

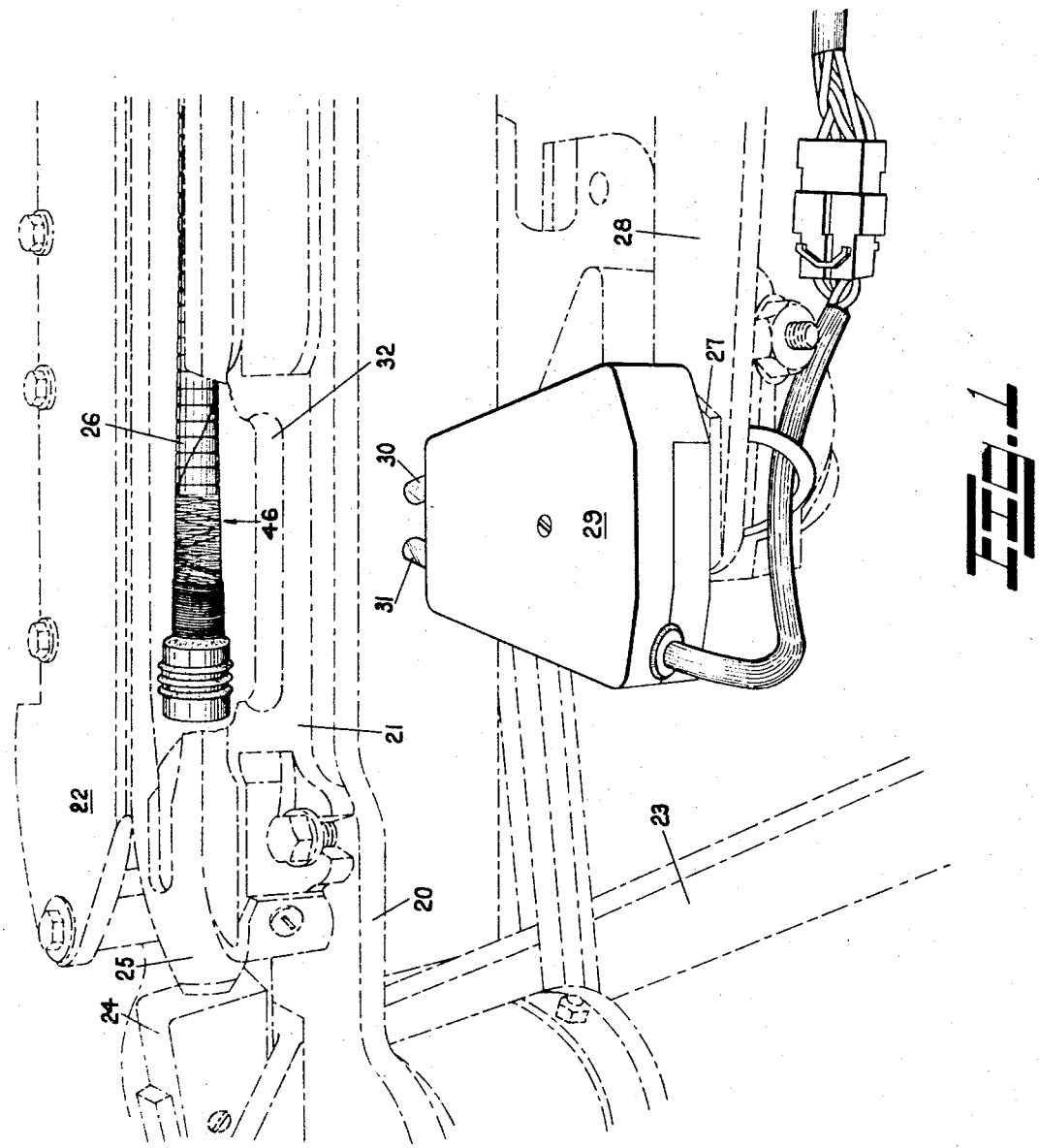

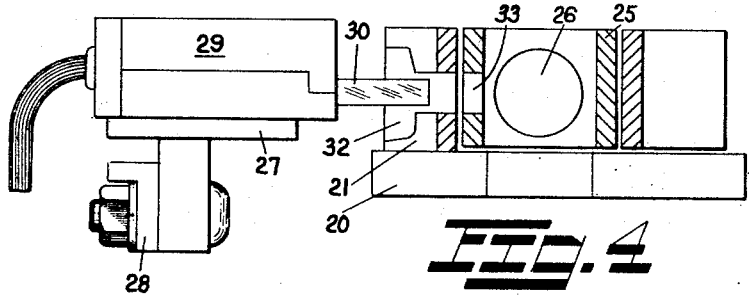
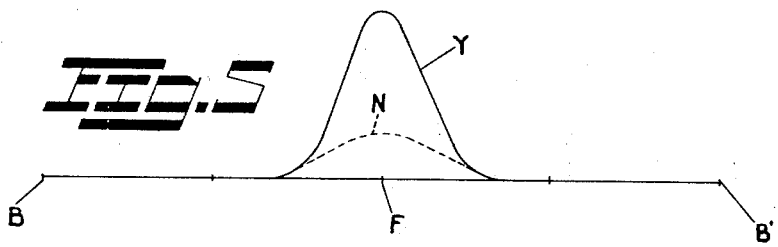
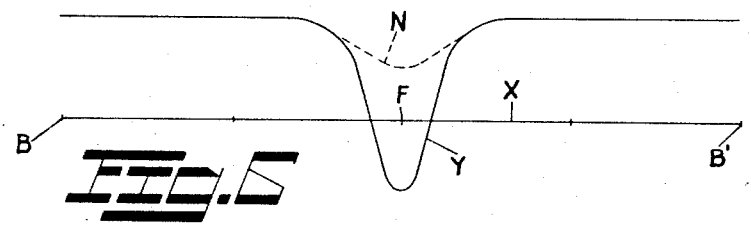
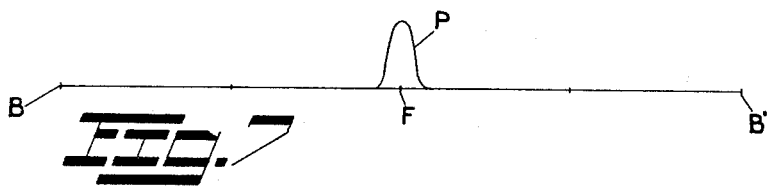
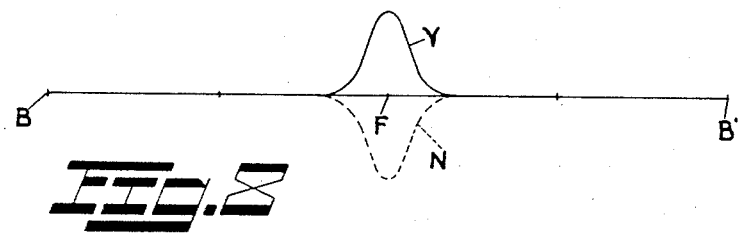

United States Patent Office 3,444,903
Patented May 20, 1969

3,444,903
PHOTOFEELER SYSTEM AND METHOD FOR FILLING DETECTION IN LOOMS
Roger G. Papelian, Milford, and Walter James Budzyna, East Douglas, Mass., assignors, by mesne assignments, to John Donald Marshall and Horace L. Bomar as Trustees of the Carolina Patent Development Trust
Filed July 28, 1966, Ser. No. 568,441
Int. Cl. D03d 45/10
U.S. Cl. 139—273                                                   7 Claims This invention pertains to filling feelers for bobbin-changing looms and more particularly to a photoelectric sensing means with associated electronic circuitry for determining the necessity for and then initiating a bobbin transfer.

In fly-shuttle looms it is well known to replace automatically a nearly exhausted filling bobbin with one having a full supply of yarn. Numerous mechanical devices have been in use for determining the proper moment of transfer by actual physical contact with the bobbin and filling. Such feelers have generally been active each time the bobbin within the shuttle is present in a particular shuttle box and the loom effecting a beat-up. The continual contact has in the past often damaged the yarn and caused loom-stoppage or defects in the woven material. Also as loom speeds have been increased the mechanical devices initiated faulty transfers because of erratic operation within the devices themselves or by reason of the shuttle rebounding.

Most previously known photo-electric feeler devices have required complicated detecting means which have been costly and were difficult to set up accurately, and in addition have needed expensive means applied to each bobbin as a reflector to complete the sensing operation. In such known devices, the contrast ratio has been of necessity very low, which has made many outside influences critical to their operation. They have been adversely affected by variances in power voltage or ambient light level, lamp or light source deterioration, and by the accumulation of lint or dust upon the lenses, etc.

It is therefore a general object of the invention to devise a photofeeler system which will overcome many of the above-mentioned disadvantages.

It is a further object of the invention to devise a filling photofeeler which shall be capable of sensing and reacting to light variations within a greatly increased margin of contrast.

It is a still further object of the invention to devise a photofeeler system whereby the necessity for amplification of the light beams is eliminated and advantages from a low-voltage light source in conjunction with solid-state components are found in their exceptional reliability and extended life expectancy.

It is a further object to devise a photofeeler system whose operation may be reversed quite simply to interchange between sensing dark colored bobins carrying light yarn and light colored bobbins carrying dark yarn.

It is a further object of the invention to devise a filling photofeeler system which shall be more effective and efficient than those heretofore known an initiating filling replenishment as a result of sensing and comparing light rays reflected from a bobbin thoroughly covered with filling and one sparsely covered and nearing exhaustion.

It is a further object of the invention to define a method for sensing the need for a replacement bobbin by comparing the magnitude of beams of light being reflected from a bobbin covered with yarn and one substantially empty.

These and other objects of the invention will become apparent as further details are disclosed.

In photoelectric filling detector devices of the prior art, detection of the necessity for filling transfer has been made by comparing the rays reflected from the filling itself with other rays of radically differing intensity being returned from the empty or practically empty bobbin. It has in many such cases been necessary to apply costly additional reflective surfaces to each bobbin to obtain the desired results. These known devices have only been operable within a narrow margin of contrast and have been adversely affected by outside influences which are practically impossible to control.

The instant invention on the other hand discloses a simplified detection system for distinguishing between light colored yarn and a dark bobbin and also between dark colored yarn and a light bobbin with only a narrow intervening grey zone where the yarn and bobbins approximate each other. An increased contrast ratio of approximately 30:1 has resulted while eliminating the necessity for light amplification.

The invention will be described by reference to a specific embodiment thereof as illustrated in the accompanying figures of drawing, wherein:

FIG. 1 is a perspective view showing the photofeeler housing with the shuttle and a bobbin in the left-hand shuttle box;

FIG. 4 is a side elevation of the feeler housing in the detecting position with the shuttle and shuttle box shown in section;

FIG. 5 is a diagrammatic view showing a comparision of the reflected light values from full and empty bobbins as the lay approaches and leaves front center;

FIG. 6 is a diagrammatic view showing the characteristics of the resistance bridge with respect to the lay position;

FIG. 7 is a diagrammatic view showing the timing of voltage pulse relative to the lay approaching front center; and FIG. 8 is a diagrammatic view showing the voltage pulse output from the resistance bridge with respect to the lay position.

Figure 3:
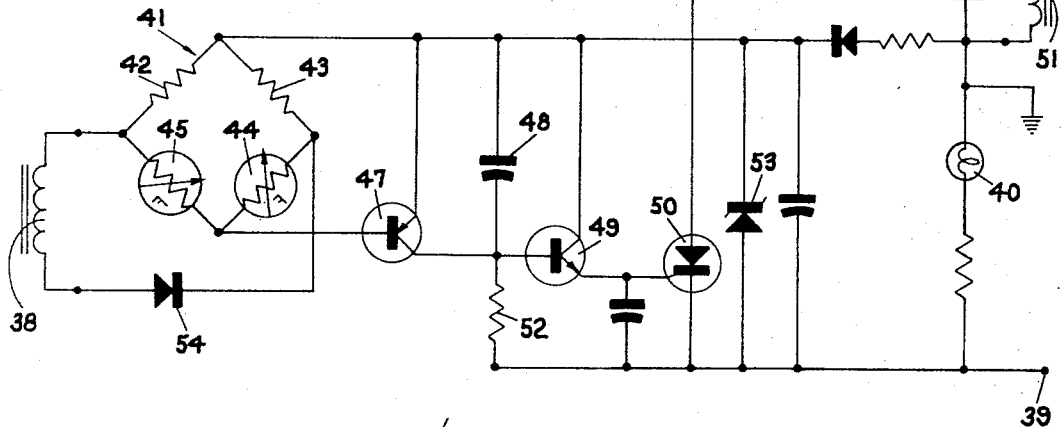
FIG. 3 is a diagrammatic view of the circuitry of the preferred embodiment of the invention.

Now referring to FIG. 1, the left-hand side of a loom is phantomly drawn to show the relative position of the feeler device. A lay end 20 supports a front box plate 21 and a back box plate extension 22 to form a shuttle box in a known manner. A picker stick 23 carrying a picker 24 is adapted to reciprocate inwardly of the shuttle box in propelling the shuttle 25 and bobbin 26 in the weaving operation. The parts shown thus far will be rocked forward and back as is usual in fly-shuttle looms and, upon alternate picks, the bobbin will be present as shown in the left-hand box. In the embodiment disclosed, the photofeeler is directed in a generally horizontal plane, however, it is deemed equally suitable to view the bobbin from other angles, as for example, from a vertical plane either above or below the shuttle box.

A feeler bracket 27 is firmly secured to the stationary framework 28 of the loom and supports the photofeeler housing 29 in a position just forward of the front box plate 21 when in thef ront center location. The term "front center" as used herein refers to the rotation of the loom's crankshaft (not shown) which at front center places the shuttle box in its forwardmost position. Fastened within the housing 29 and extending outwardly therefrom are two transparent light pipes formed as shown of round acrylic plastic. The first light pipe 30 is adapted, as will be explained, to direct beams of light toward the bobbin and the second light pipe 31 will receive light reflected from the bobbin and transmit such light inwardly of the housing 29. The light pipes 30 and 31 will extend into the front box plate 21 through a slot 32 which will index with a similar slot 33 in the shuttle 25 through both of which the bobbin may be observed (FIG. 4). The axes of the pipes 30 and 31 are angularly disposed so as to intersect in the vicinity of the bobbin 26 when near front center.

Figure 2:
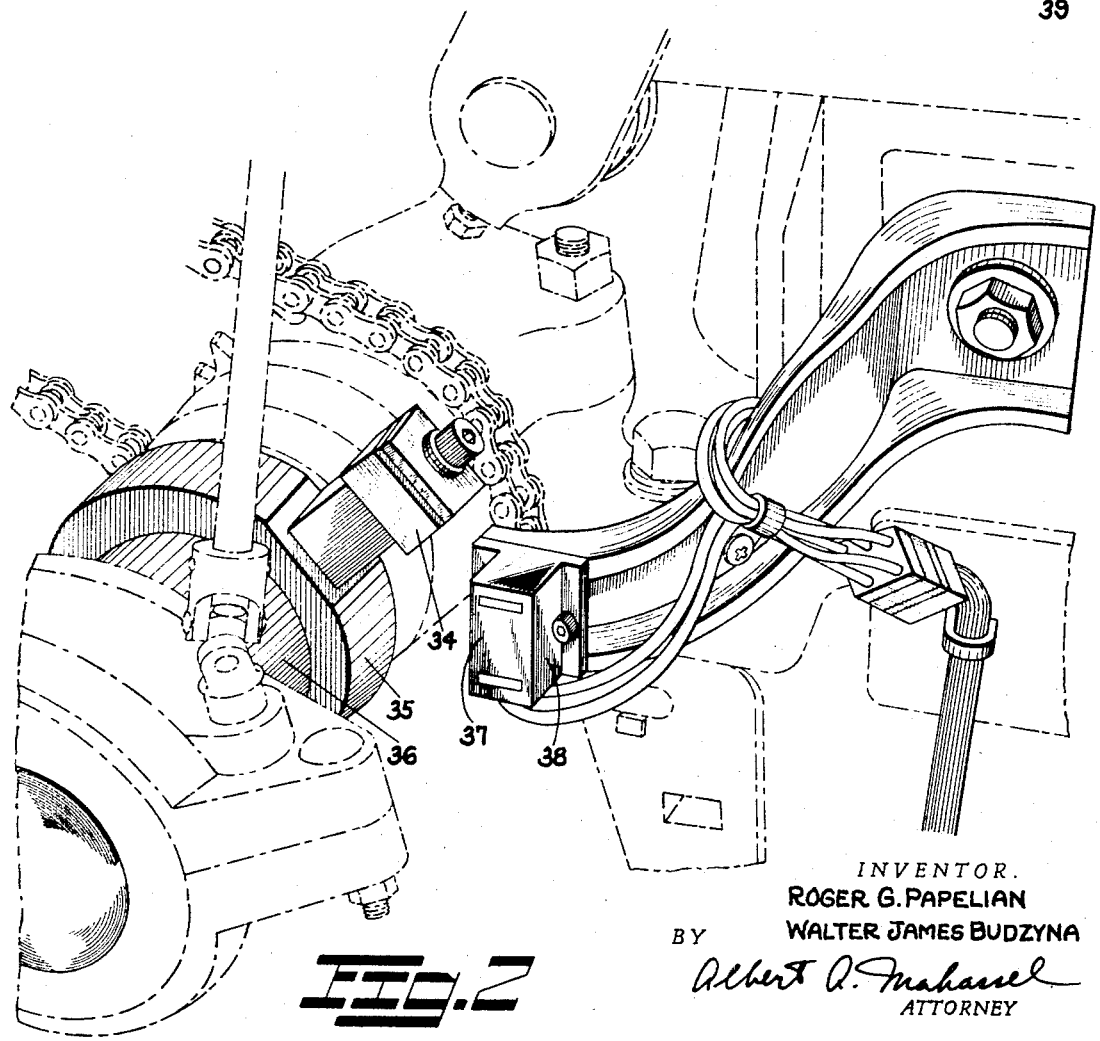
FIG. 2 is a perspective view of the pickup magnet and pickup coil.

In FIG. 2, a magnet 34 is fastened to a collar 35 which is adjustably secured for rotation with the loom cam shaft 36. This has the advantage of being accurately timed for alternate pick detection. As the magnet 34 is rotated it will, with predetermined timing, pass adjacent the face 37 of a pickup coil 38 and the magnetic field will induce a voltage pulse in the coil 38.

The coil 38 is wired to the circuitry contained within the housing 29 as shown in FIG. 3. Power input 39 on the order of 12–16v. A.C. feeds the circuitry which includes a lamp 40 directed toward the inner end of the light pipe 30 to conduct the light rays toward the bobbin. Diode 54 rectifies the voltage pulse from the coil 38 and allows a pulse of the proper polarity to pass on to the rest of the circuitry.

The operation will be explained for the condition whereby white or light colored yarn is wound upon black or dark colored bobbins. This provides sufficiently high contrasting light reflecting values between loaded and nearly exhausted bobbins. The opposite condition where dark yarn is wound upon light colored bobbins is readily detected with the instant invention by reversal of a portion of the circuitry.

The positive half of the voltage pulse induced in the pickup coil 38 is coupled to a photocell-resistor bridge, generally designated 41, having resistors 42 and 43 together with photocells 44 and 45. The photocell 44 is positioned adjacent the inner end of the second light pipe 31 to react to the reflected light rays received therethrough. The photocell 45 acts to compensate for variations in light intensity due to various outside causes.

A detection of the bobbin condition is made at each alternate pick as the shuttle box nears front center with the shuttle and bobbin in the left-hand box. If the bobbin is covered with yarn at the point of observation 46, which is approximately suggested by the arrow in FIG. 1, the light reflected from the white yarn will be in the high range of reflective light. The resistance of the photocell 44 will change from a high value to a very low value which will unbalance the resistance bridge 41 and cause a positive pulse to be coupled to the first transistor 47. This positive pulse is of the wrong polarity and will not cause the transistor 47 to conduct, thus the balance of the circuit is not activated (FIG. 3).

This condition will continue until the bobbin is nearly exhausted with the dark colored bobbin showing through the thin covering of yarn, or somewhat similar to that shown in FIG. 1. The light reflected by this second condition has been greatly reduced and falls within the lower range of reflective light. With less light reflected toward the photocell 44, its resistance does not drop to the low value as before, and the resistance bridge will be unbalanced in the opposite direction. This will couple a negative pulse to the base of the transistor 47 and bias it in a forward direction causing it to conduct. This places a direct short across a capacitor 48 thereby discharging it, and also forward biases a second transistor 49. The second transistor 49 couples the pulse to the gate of a silicon control rectifier 50 triggering it into conduction, which pulls in a solenoid 51. The solenoid 51 will activate the loom transferring mechanism (not shown) and a full bobbin will be injected.

When the pulse at the base of the transistor 47 has passed, that transistor turns off and removes the short across the capacitor 48. The capacitor 48 immediately begins charging through a resistor 52 thereby holding the second transistor 49 on for approximately one hundred milliseconds. This will hold the solenoid 51 in longer than would have been done by the pickup coil 38 pulse alone and insures proper action by the transferring mechanism. When the capacitor 48 has charged, the second transistor 49 turns off which removes the trigger voltage from the gate of the silicon control rectifier 50, releasing the solenoid 51.

The circuit is protected against sensitivity changes due to voltage variations by a Zener diode 53. Fluctuations in lamp intensity are compensated by the photocell 45.

By reversing the diode 54, which will reverse the polarity of the input pulse to the resistor bridge 41, the opposite condition of sensing dark yarn on light colored bobbins may be achieved. The transistor 47 will receive a negative pulse on its base, thereby activating the remainder of the circuit, when the photocell 44 is receiving a large amount of reflected light from a light colored bobbin nearly depleted of dark colored yarn.

The amount of yarn left upon the bobbin as it is ejected from the shuttle is controlled by the magnitude of the voltage pulse applied to the resistance bridge 41 when it is unbalanced in the desired direction which will forward bias the transistor 47. The magnitude of the voltage pulse is varied by adjusting the airgap between the magnet 34 and the pickup coil 38.

With the instant invention accurate sensing of the bobbin condition is made through comparison of the light reflected from the bobbin at a specific point in each alternate picking cycle. The reflected light will fall within a range of intensity and depending upon the quantity of yarn remaining, will be in the upper or lower end of that range. In FIG. 5 the amount of light reflected from the bobbin into photocell 44 is diagrammatically shown with respect to the lay position, the lay moving from back center B to front center F and returning to back center B. The curved line Y represents light reflected from a bobbin containing yarn and the dotted line N represents light from a depleted bobbin.

In FIG. 6, the characteristics of the resistance bridge are shown with respect to the lay position. Solid line Y represents bridge unbalance for a bobbin containing yarn and dotted line N bridge unbalance for a depleted bobbin. Base line X represents a balanced bridge condition.

In FIG. 7, the lay movement is the same as in FIG. 5 with timing of the positive portion of the voltage pulse from the coil 38 shown as line P.

FIG. 8 shows the voltage pulse output from the bridge with respect to the lay position. Solid line Y represents the positive pulse output to transistor 47 when yarn is present on the bobbin and dotted line N shows the negative pulse output when the yarn has been depleted.

From the explanation above it will be seen that the invention provides a photofeeler filling detecting system and method which is greatly simplified from those previously known. The system will be reliable and long-lasting through the use of solid-state components and the elimination of contact closure devices such as switches and relays.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

We claim:
1. A filling bobbin detecting system for a loom replenishment mechanism which includes a light source being directed toward said filling bobbin, electronic sensing means for differentiating the range of intensity of light rays reflected from said filling bobbin, said sensing means reacting differently to light rays falling within one portion of said range than from rays falling within a second portion of said range, and pulse inducing means coupled with said sensing means for signalling said replenishment mechanism only when light rays which fall within one of said portions are reflected from bobbin, a photocell-resistor bridge having one photocell disposed to receive light rays reflected from said bobbin, and a second photocell providing compensation for changes in intensity within said light source, said light source comprising a low-voltage lamp being fixed within a housing, a transparent light pipe endwise adjacent said lamp for transmitting light rays longitudinally therethrough, and a second light pipe directed toward said one photocell and extending outwardly from said housing for transmitting the light rays being reflected from said filling bobbin.

2. The bobbin detecting system of claim 1 wherein said first and second light pipes being angularly disposed toward each other have axes intersecting at a point upon said filling bobbin when in a position for sensing.

3. The bobbin detecting system of claim 2 wherein said pulse inducing means includes a magnetic-field producing means and a pickup coil being intermittently incited through the presence of said magnetic-field.

4. The bobbin detecting system of claim 3 wherein said magnetic-field producing means includes a rotatably supported magnet being passed in timed intervals before said pickup coil for coacting with said sensing means in signalling for bobbin replenishment.

5. The bobbin detecting system of claim 4, which further includes a solenoid reacting to signals received through said sensing means for initiating activation of said replenishment mechanism.

6. The bobbin detecting system of claim 5 which further includes means for extending the reacting time-period allotted to said solenoid to exceed that of the time-period produced by said voltage pulse.

7. The bobbin detecting system of claim 6 wherein said time extending means includes a resistor in combination with a capacitor.

References Cited

UNITED STATES PATENTS

| 2,522,101 | 9/1950 | Dion et al. | 139—273.1 |
| 3,053,139 | 9/1962 | Loepfe | 139—273.1 |

FOREIGN PATENTS

| 983,704 | 2/1965 | Great Britain. |

HENRY S. JAUDON, *Primary Examiner.*